C. A. MARSHALL.
TRACTOR.
APPLICATION FILED APR. 13, 1918.
1,301,583.
Patented Apr. 22, 1919.
3 SHEETS—SHEET 1.
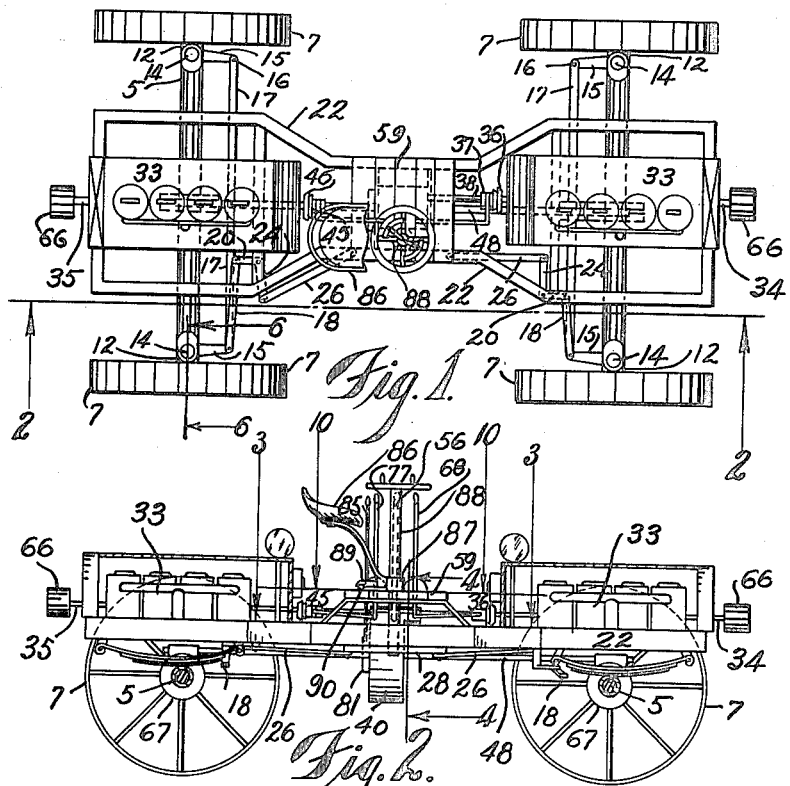
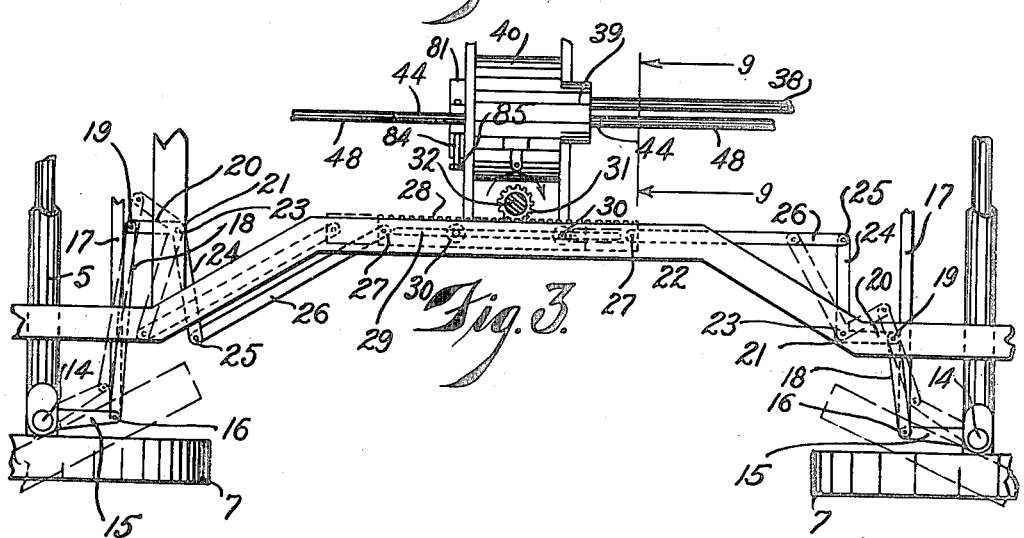
Inventor
C. A. Marshall.

C. A. MARSHALL.
TRACTOR.
APPLICATION FILED APR. 13, 1918.
1,301,583.
Patented Apr. 22, 1919.
3 SHEETS—SHEET 2.
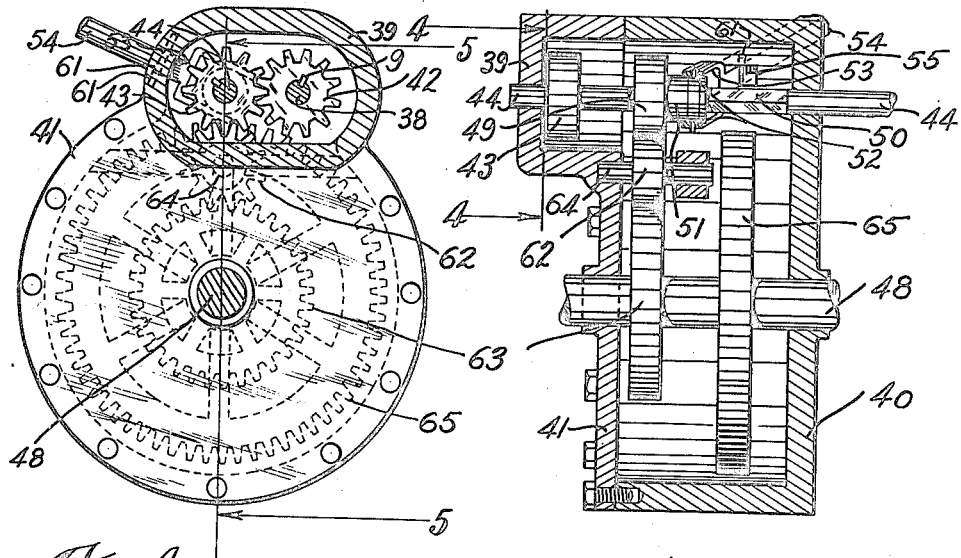
Fig. 4.    Fig. 5.
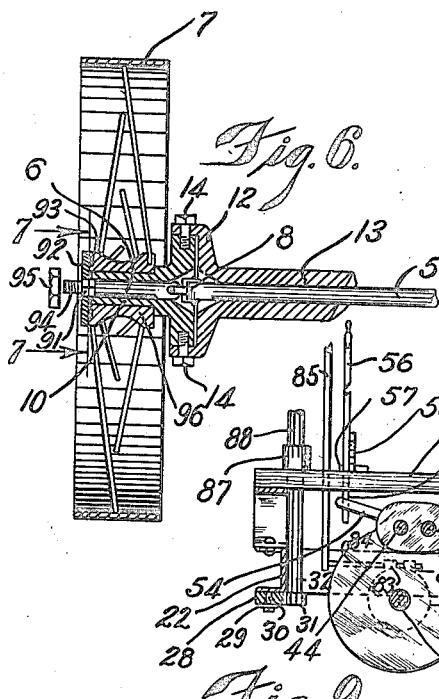
Fig. 6.
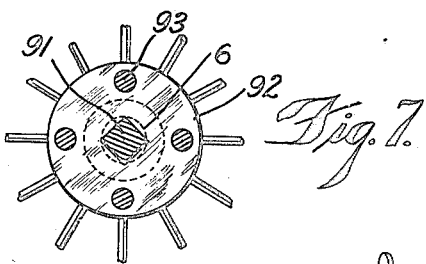
Fig. 7.
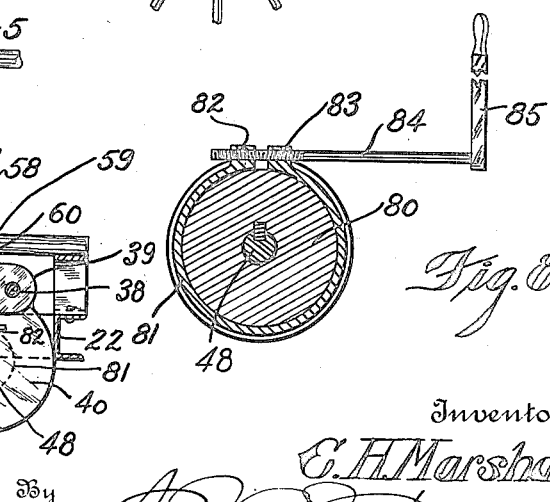
Fig. 8.
Fig. 9.
Inventor
C. H. Marshall.
By
Attorneys C. A. MARSHALL.
TRACTOR.
APPLICATION FILED APR. 13, 1918.
1,301,583.
Patented Apr. 22, 1919.
3 SHEETS—SHEET 3.
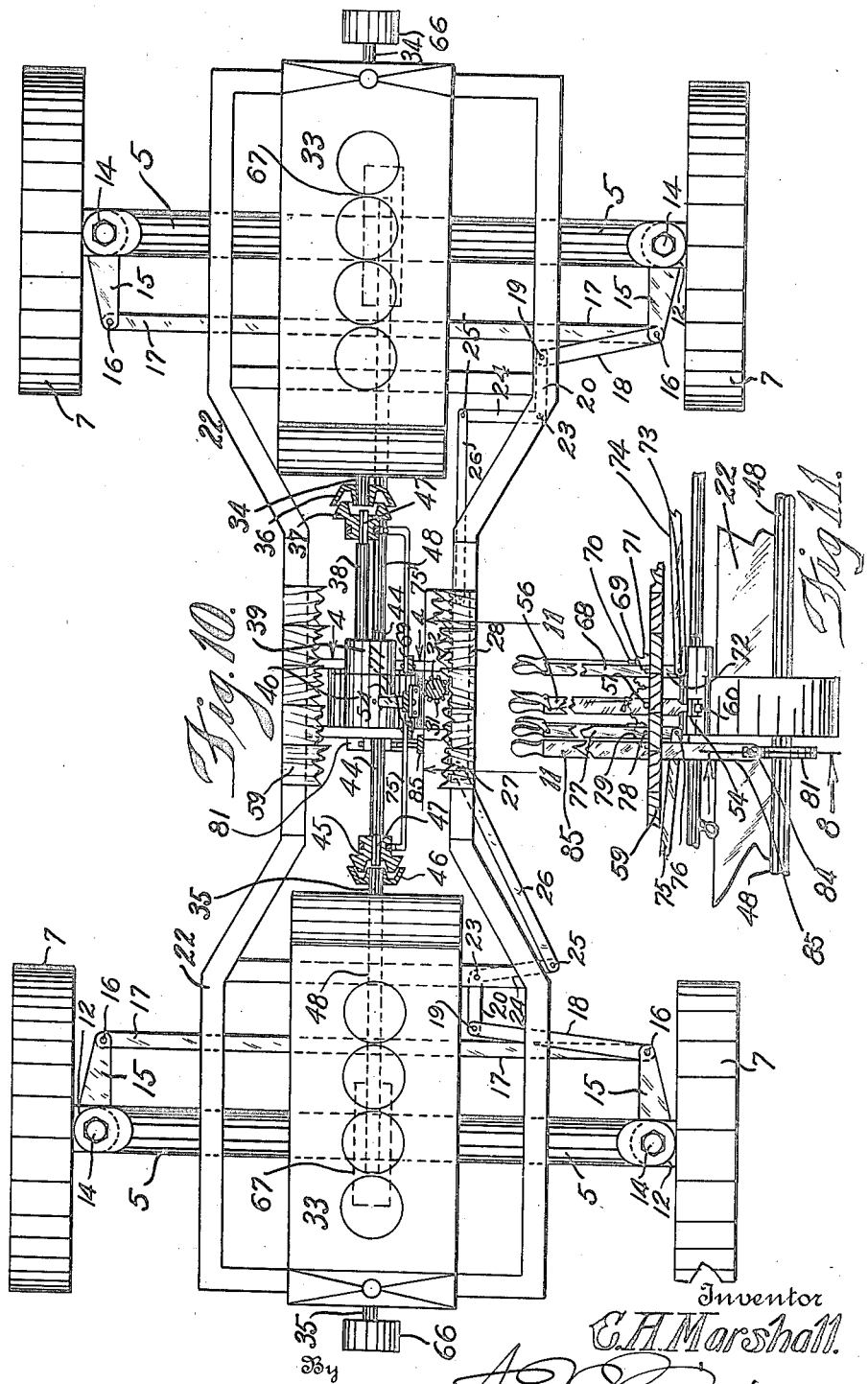

UNITED STATES PATENT OFFICE.

CHARLES A. MARSHALL, OF DENVER, COLORADO, ASSIGNOR OF ONE-HALF TO LOUIS H. BLONGER, OF EDGEWATER, COLORADO.

TRACTOR.

1,301,583.

Specification of Letters Patent.

Patented Apr. 22, 1919.

Application filed April 13, 1918. Serial No. 228,490.

*To all whom it may concern:*

Be it known that I, CHARLES A. MARSHALL, a citizen of the United States, residing at the city and county of Denver and State of Colorado, have invented certain new and useful Improvements in Tractors; and I do declare the following to be a full, clear, and exact description of the invention, such as will enable others skilled in the art to which it appertains to make and use the same, reference being had to the accompanying drawings, and to the characters of reference marked thereon, which form a part of this specification.
My invention relates to improvements generally speaking in motor vehicles, but is more particularly intended for use in connection with tractors, one object of the invention being to provide a construction of this class in which a plurality of motors, as internal combustion engines, may be employed in connection with the same vehicle, the construction embodying suitable mechanism for controlling these motors, whereby they may be used conjointly or separately for power purposes, as may be required, provision also being made for applying power through the medium of one or both or all of the motors to both axles. The construction and arrangement is also such that the extremities of the vehicle may be alternately front and rear. Provision is also made for changing the speed from low to high or high to low according as the vehicle is used in the field for heavy work or on the road for light work, the low speed being used in the field and the high speed on the road. Furthermore, in changing from low to high speed an interposed idler gear is employed, whereby the direction of travel of the vehicle is reversed so that while one end of the machine may be the front end in the field, the opposite end will be the front end on the road. This construction and arrangement necessitates that both sets of wheels are adjustable or shiftable for steering purposes. Furthermore, both sets of wheels are connected with their respective axles by universal joints in order that the power transmitted to both axles may be utilized for driving both sets of wheels.

Having briefly outlined my improved construction I will proceed to described the same in detail, reference being made to the accompanying drawing in which is illustrated an embodiment thereof. In this drawing:

Figure 1 is a top plan view of my improved motor vehicle shown on a relatively small scale.

Fig. 2 is a section taken on the line 2—2, Fig. 1 viewed in the direction of the arrows.

Fig. 3 is a fragmentary horizontal section of the machine taken on the line 3—3, Fig. 2 looking downwardly, or viewed in the direction of the arrows, the parts being shown on a larger scale.

Fig. 4 is a view of the gearing mechanism employed in utilizing the power of two motors of the internal combustion class, the parts being shown on a much larger scale than in the previous views. This is a section taken on the line 4—4, Fig. 5.

Fig. 5 is a section taken on the line 5—5, Fig. 4.

Fig. 6 is a section taken through one of the ground wheels and its axle. This may be considered a section taken on the line 6—6 Fig. 1 looking toward the left, the parts being shown on a larger scale.

Fig. 7 is a section taken on the line 7—7, Fig. 6 looking toward the right, the parts being shown on a still larger scale.

Fig. 8 is a section taken through the band brake mechanism on the line 8—8, Fig. 11, the parts being shown on a much larger scale.

Fig. 9 is a section taken on the line 9—9, Fig. 3 looking toward the left.

Fig. 10 is a horizontal section taken on the line 10—10 Fig. 2 looking downwardly, parts being broken away and parts sectionized below the said line, the construction being shown on a larger scale.

Fig. 11 is a section taken on the line 11—11, Fig. 10, viewed in the direction of the arrows.

The same reference characters indicate the same parts in all the views.

Let the numeral 5 designate the axles of the vehicle, each of which is connected at opposite ends with stub shafts 6 on which the ground wheels 7 are mounted, by universal joints 8, whereby the construction is adapted for transmitting power to the four ground or traction wheels of the machine. Bushings 10 which engage respectively the stub shafts 6 of each pair of wheels, are respectively connected with bifurcated parts 12 of a stationary sleeve 13 of each axle, to swing on vertical axes, the opposite ends of each of which are in alinement with the centers of the bolts 14 in Fig. 6. Each of these bushing members 10 is provided with a crank 15, the two cranks of each pair of wheels being pivotally connected, as shown at 16, with the opposite ends of a transverse rod or link 17 for steering purposes. Each crank on one side of the machine is also connected at the axis of the shaft 16 with one end of a link 18, the opposite end of the link being pivotally connected, as shown at 19, with one arm 20 of a bell crank lever 21 fulcrumed on the frame work or chassis 22 of the machine, as shown at 23, the other arm 24 of the bell crank lever being pivotally connected as shown at 25 with one end of a rod 26, the opposite end of the rod being pivotally connected, as shown at 27, with a rack bar 28, the latter being slidably supported on the frame work of the machine as best illustrated in Figs. 3 and 9, the bar being slotted as shown at 29, to receive fastening devices 30 which engage the frame work and support the bar in operative relation. The teeth or cogs of this rack bar are in mesh with a pinion 31 fast on a steering post 32. By adjusting the rack bar longitudinally, the four wheels of the machine at the opposite ends of the latter will be shifted, as indicated by dotted lines in Fig. 3, for steering purposes.

Upon the fame work or chassis 22 of the machine are mounted two motors or engines 33 of the internal combustion engine type, one engine having a shaft 34, and the other a shaft 35, the two shafts being given separate reference characters for convenience of description. The shaft 34 has a clutch member 36 fast thereon and arranged to coöperate with a slidably adjustable clutch member 37 fast on a relatively short shaft 38, the latter extending into an auxiliary housing 39 formed integral with a part 41 of a main housing member 40. The extremity of the shaft 38 which enters the housing member 39 is provided with a gear or pinion 42 which is keyed to the shaft, as shown at 9. This gear 42 meshes with a similar gear 43 of the same size and fast on a shaft 44 which extends from the auxiliary housing 39 through the main housing 40 and toward the engine shaft 35 with which it is in alinement, the extremity of the shaft 44 adjacent the shaft 35 being provided with a clutch member 45 slidable on the shaft and adapted to coöperate with a similar member 46 fast on the engine shaft 35. It will be noted that each of the clutch members 37 and 45 is mounted on a part 47 of its shaft which is polygonal, preferably square, in cross section, the clutch member having an opening of counterpart shape.

When the two clutch members 37 and 45 are in coöperative engagement with the companion members 36 and 46, the two engines are working in harmony, and in order to utilize their conjoint power, it is only necessary to connect one of the shafts in operative relation with a driving shaft 48 which is located below the engine shafts as best illustrated in Fig. 11. As illustrated in the drawing, the shaft 44 which when the clutch members 45 and 46 are in coöperative engagement, is virtually integral with the shaft 35, is also provided with a gear 49 which is slidable on a part 50 of the shaft 44 which is polygonal, preferably square in cross section, and engages a counterpart opening in the gear 49, the latter having an extension hub 51 which is pivotally connected as shown at 52 with a bifurcated extremity 53 of a lever arm 54 which passes through an opening 55 formed in the main housing 40, this lever being connected in operative relation with a lever 56 fulcrumed as shown at 57, and coöperating with a quadrant 58 mounted on a platform 59. As shown in the drawing, an arm 60 of the lever 56, said arm extending below the fulcrum, passes through an opening formed in the outer extremity of the lever 54, the latter being fulcrumed in the auxiliary housing, as shown at 61. Hence, as the lever 56 is manipulated, the coöperating lever 54 will be actuated to shift the gear 49 on the part 50 of the shaft 44. This gear 49 is adapted to occupy any one of three positions, one or that shown in Fig. 5 in mesh with a gear 62 which in turn meshes with a gear 63 fast on the drive shaft 48, the gear 62 being fast on a short shaft 64 mounted in the housing, as shown in Fig. 5. Another position of the gear 49 into which it may be thrown by the lever 54 is in mesh with a relatively large gear 65 also fast on the drive shaft 48. The gear 65 is considerably larger than the gear 63, hence, the necessity in order to operate the gear 63 from the gear 49 of employing an intermediate or idler gear 62. As the idler gear is of the same size as the gear 49 when the last named gear is in mesh with the gear 62, the propelling shaft will be operated at a higher speed for a given rotation of the shaft 44, than when the gear 49 is in mesh with the larger gear 65 on the driving shaft. Hence, when the machine is in the field, the large gear 65 should be in mesh with the gear 49, while when on the road and greater speed is required, the gear 49 should be in the position shown in Fig. 5. When, however, it is desired to disconnect the power of the engine from the driving shaft 48, the gear 49 is left in the intermediate position or in the space between the gears 65 and 62. In this event, if the engines are running, power may be taken from the outer extremity of either of the shafts 34 or 35 through the medium of a pulley 66 for doing any work that may be required by the person owning the tractor, the latter in this particular case serving as a stationary power plant.

It should be explained that the driving shaft 48 is suitably connected at its opposite extremities with suitable differential mechanism 67 which is connected in operative relation with an axle 5 in each instance. This differential mechanism which it is believed may be of any ordinary construction must, of course, be of such character that the rotation of the driving shaft 48 will rotate the two axles 5 simultaneously in the same direction. It will be understood, however, that when the driving shaft is operated through the medium of the three gears 49, 62 and 63 it will be rotated in a direction opposite from that when operated through the medium of the gears 49 and 65, since the interposed idler gear 62 serves to operate the shaft 48 in a direction opposite that in which it would rotate if the gear 49 were in direct mesh with the gear 63.

The clutch member 37 is shifted on its shaft 38 for the purpose of causing it to engage or disengage the companion clutch member 36 through the medium of a hand-lever 68 fulcrumed at 69 and having a dog 70 coöperating with the quadrant 71 in the usual manner, the lower arm 72 of the lever below its fulcrum being pivotally connected, as shown at 73, with a rod 74 whose opposite end is connected in operative relation with the hub of the said clutch member 37.

Again, the clutch member 45 is shifted on its shaft 44 to cause it to engage or disengage its companion clutch member 46 through the medium of a rod 75 which is pivotally connected, as shown at 76, with the lower arm of a hand lever 77, the latter being fulcrumed, as shown at 78, and coöperating with a quadrant 79 (see Fig. 11).

As illustrated in the drawing (see Figs. 8 and 11), a brake wheel 80 is keyed to the shaft 48 and surrounded by a brake band 81 whose opposite extremities are threaded to receive right and left threads 82 and 83 formed on a shaft or a spindle 84 which is operated from a lever arm 85, the said arm being employed to rotate the shaft 84 for the purpose of tightening or loosening the band 81 upon the brake wheel.

Attention is called to the fact that the levers 56, 68, 77 and 85 are all conveniently arranged to be operated by the person in charge of the machine, who occupies an adjustable seat 86 which may be shifted upon the platform 59 to occupy the one or other position, as may be required, the seat having a hub 87 rotatable on the sleeve 88 of the steering shaft 32, this hub also having a horiozntally projecting arm 89 carrying a small wheel 90 which engages the upper surface of the platform. This mechanism may be of any suitable or ordinary construction.

From the foregoing description the use and operation of my improved motor vehicle will be readily understood. Assuming that it is desired to use the power of both engines or motors to operate the machine when doing work in a field, as for plowing purposes, in which case a gang of plows (not shown) will be carried by the frame work of the machine, both clutch members 37 and 45 will be in coöperative engagement with their companion members 36 and 46, and the gear 49 will be in meshing relation with the large gear 65 on the driving shaft 48. Again, if it is desired to use the power of both engines for operating the machine when on the road, the gear 49 may be shifted into meshing relation with the gear 62, or will be in the position illustrated in Fig. 5. Again, if it is desired to use but one of the engines either in the field or on the road, one of the clutch members 37 or 45 will be disengaged from its companion clutch member. Again, if it is not desired to drive the machine or cause it to travel on its ground wheels 7, the gear 49 will be thrown into the neutral position between the two gears 62 and 65. In this event the power of the two engines may be utilized for doing any kind of work desired through the medium of either of the pulleys 66. It will be understood that either engine may be utilized alone when the machine is used as a stationary power plant by simply cutting out the other engine by the shifting of one of the clutches 37 or 45 out of engagement with its companion or coöperating member.

Attention is called to the fact that each stub shaft 6 of each axle extends outwardly a short distance beyond the bushing 10, its protruding portion 91 being polygonal, preferably square in cross section. A disk 92 is applied to the part 91 of the stub shaft and has an opening in which said part fits, the disk having interiorly projecting lugs 93 which enter counterpart recesses formed in the hub proper 96 of the wheel; the disk being held in place in engagement with the hub and with the part 91 of the stub axle by a nut 95 which is threaded on a part 94 of the stub shaft, the nut being screwed to engagement with the disk. This is a special construction for causing each wheel 7 to rotate with its axle through the medium of the stub shaft which has a universal joint connection with the main axle member, as heretofore explained.

Having thus described my invention, what I claim is:

1. In a tractor, a chassis, a pair of wheels mounted on each end thereof, a motor mounted on each end of the chassis, and connections between each of said motors and all of said wheels for driving the latter, said connections comprising a single transmission to which both of said motors supply power.

2. In a tractor, a chassis, a pair of wheels mounted on each end thereof, a motor mounted an each end of the chassis, and connections between each of said motors and all of said wheels for driving the latter.

3. In a tractor, a chassis, a pair of wheels mounted on each end thereof, a motor mounted on each end of the chassis, connections between each of said motors and all of said wheels for driving the latter and steering connections for all of said wheels.

4. A motor vehicle comprising a plurality of motors, an operative connection between the shafts of the motors to utilize their power conjointly, a clutch joint in the shaft of each motor between said connection and the motor, a driving shaft, and an operative connection between the driving shaft and one of the motor shafts, located between the first named connection and the clutch joint, the said connection with the said motor shaft including two gears of different size fast on the driving shaft, a gear slidable on the motor shaft and an idler gear meshing with the smaller of the two gears on the driving shaft, the said slidable gear being movable into mesh with the larger gear on the driving shaft, the idler gear, or into the neutral position between the two gears.

In testimony whereof I affix my signature.

CHARLES A. MARSHALL.